Nov. 4, 1952  J. C. KREJCI  2,616,795
PROCESS FOR PRODUCING CARBON BLACK
Filed Sept. 15, 1950  2 SHEETS—SHEET 1
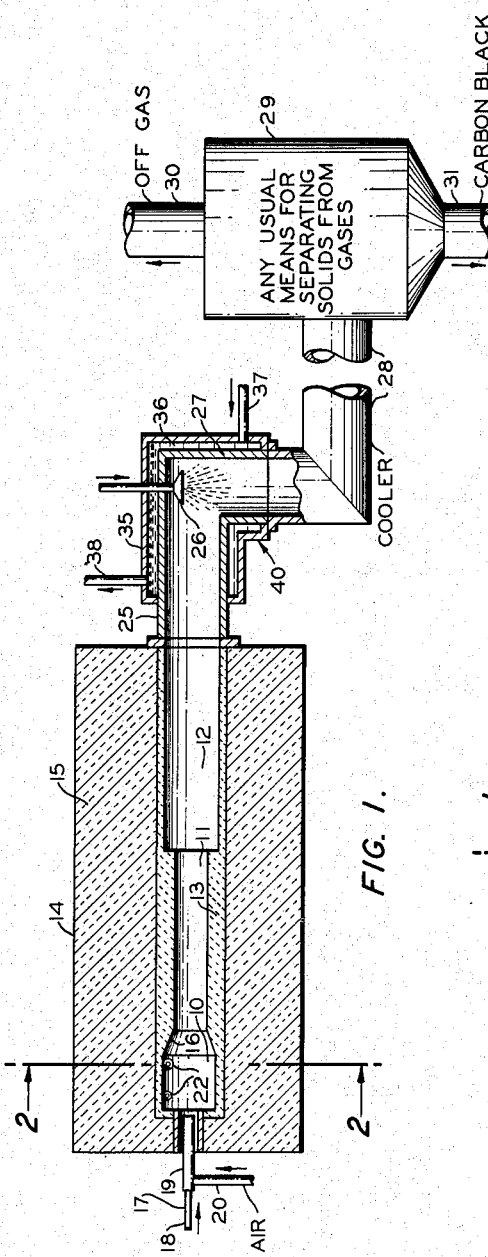
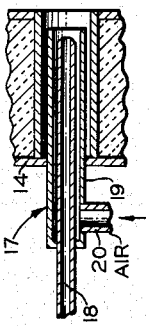
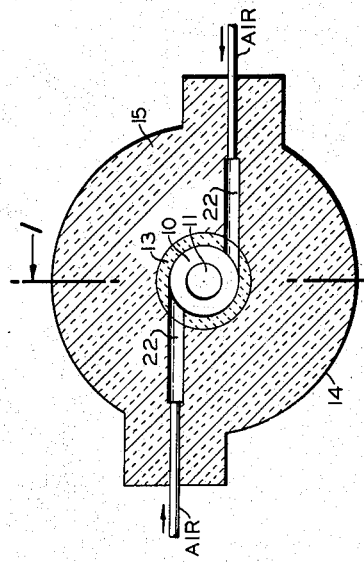
INVENTOR.
J. C. KREJCI
BY Hudson & Young
ATTORNEYS

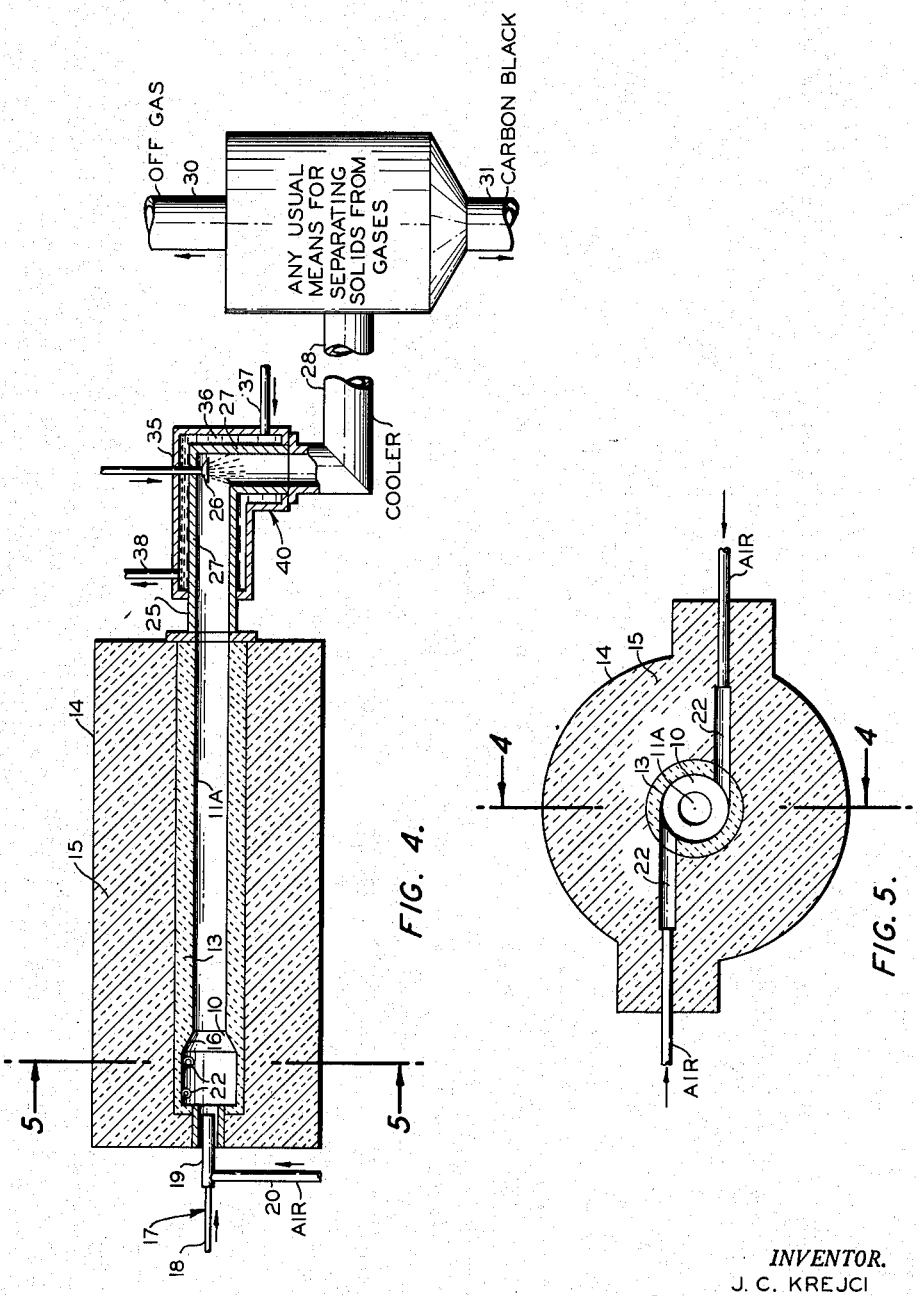

Patented Nov. 4, 1952

2,616,795

UNITED STATES PATENT OFFICE 2,616,795

PROCESS FOR PRODUCING CARBON BLACK

Joseph C. Krejci, Phillips, Tex., assignor to Phillips Petroleum Company, a corporation of Delaware Application September 15, 1950, Serial No. 185,094

20 Claims. (Cl. 23—209.8)

This invention relates to a method of making carbon black and to an apparatus for the manufacture of carbon black. In one of its more specific aspects it relates to a method for making carbon black which is characterized by its ability to impart to vulcanized rubber extraordinary resistance to abrasion. And in still another specific aspect it relates to an apparatus in which this highly rubber reinforcing carbon black can be made.

The present application is a continuation-in-part of my copending applications Serial Nos. 743,891, now forfeited, and 743,892, now abandoned, and is closely related to my copending application Serial No. 743,893, now U. S. Patent No. 2,564,700 of August 21, 1951, all three applications being entitled "Production of Carbon Black" and all filed on April 25, 1947.

At the present time, most of the carbon blacks of commerce are produced by a very few processes and these blacks may be grouped into classes depending upon the types of rubber compound and vulcanized rubber which the carbon blacks will produce. A soft carbon black as compared to a hard carbon black is one which when mixed in a conventional rubber compound and the compound vulcanized yields a rubber which is softer, more resilient, more rubbery and yet tough, whereas a hard carbon black in the same compounding formula imparts stiffer, tougher characteristics, with lower resilience to the vulcanized rubber.

Carbon black made by the channel process is frequently considered exemplary of a hard black while blacks made by furnace processes are in general considered soft blacks.

Carbon blacks made by these two processes are sometimes considered as "limits" of hardness and of softness in blacks. However, blacks harder than commercial channel blacks, and blacks softer than furnace blacks are known.

A carbon black which imparts to vulcanized rubber good resistance to abrasion along with other desirable properties is said to possess a good reinforcing value or to be highly reinforcing. Channel black possesses an excellent reinforcing value when compounded with natural rubber.

Carbon black produced as hereinafter described possesses excellent reinforcing value when compounded with natural or GR–S type synthetic rubber stocks since the abrasion losses of such vulcanized rubbers compounded with my carbon black are very low.

In the description which follows I use the terms reinforcing value and resistance to abrasion as more or less synonymous, since, as mentioned, the abrasion resistance is one of the most important properties of a vulcanized rubber when used for automotive tire treads.

The commercial "channel" process produces a hard type carbon black which is good for compounding automotive tire tread stocks that withstand abrasion and possess numerous other good physical properties. However, the yield of carbon by this process is only about 3.5% of the carbon content of the gas from which it is made. Most furnace processes give higher yields of carbon than the channel process, but in essentially all cases these blacks are of a softer type and yield a rubber having less resistance to abrasion and therefore are less desirable for use in tire tread stocks. These latter blacks find other and varied uses, which are, however, minor as compared to the relatively large amounts of hard channel black which normally go into tire treads. A process which would give a high yield of a carbon black similar to or even superior in properties to channel black, would be most desirable.

It is a main object of this invention to provide such a process.

Another object of my invention is to provide an apparatus in which such a process may be carried out.

Still another object of my invention is to provide a process for making carbon black about as hard or harder than channel black and in yields high as compared to the normal yield of channel black.

Yet another object of my invention is to devise a furnace of such design that will produce a hard and highly rubber reinforcing carbon black when operated as described hereinafter.

And still another object of my invention is to provide a process and apparatus for the production of highly reinforcing carbon black at high production rate and at high yield based upon the carbon content of the hydrocarbon from which it is made.

Numerous other objects and advantages will be apparent to those skilled in the art upon reading the accompanying specifications, claims and drawing.

The accompanying drawing, in diagrammatic form, is a part of this specification and illustrates two species of apparatus embodying the apparatus concepts of my invention in which to practice the process of my invention.

In the drawing:

Figure 1 is a longitudinal sectional view of a furnace embodying my invention taken on the line 1—1 of Figure 2. This figure also shows, diagrammatically the cooling apparatus, partly in section and partly in elevation.

Figure 2 is a transverse sectional view of the same furnace taken on the line 2—2 of Figure 1.

Figure 3 is an enlarged view of a portion of Figure 1 showing the reactant hydrocarbon inlet tube 18 and related parts in greater detail.

Figure 4 is a longitudinal sectional view of a second species of furnace embodying my invention taken along the line 4—4 of Figure 5.

Figure 5 is a transverse sectional view of the furnace of Figure 4 taken along line 5—5 of Figure 4.

Like numerals on the figures represent like or similar parts. The drawing is herein presented in diagrammatic form only, and such member parts as feed line, air carrying pipes, combustible gas pipes, pumps, valves, meters, pressure gages, pressure regulators, temperature indicators and regulators, and other conventional apparatus are not shown for purposes of simplicity.

According to the preferred species of this invention, shown in Figures 1 to 3, carbon black is produced by an improved process using a reactor system of three cylindrical sections, one short section and one long section of about equal diameters separated by a long section of diameter smaller than that of the other two. The operation, broadly, comprises passing a hydrocarbon, termed "reactant hydrocarbon," for conversion to carbon black axially into the short or combustion section, thence into the small diameter or reaction section and finally into the larger diameter outlet section of the furnace. From this outlet section the gases carrying carbon black in suspension may be water quenched, and further cooled if desired, and the carbon black recovered from the gases by any method desired, as for example, by bag filters, by electrostatic precipitation or other means. Air is introduced tangentially into the combustion section and a portion of the axially added reactant hydrocarbon is burned to furnish heat for the operation.

In the operation of the preferred species of the process, operating with the apparatus of Figures 1 to 3, it is intended that the air which is added tangentially to the combustion section of the furnace is injected at such a high velocity that the air tends to remain adjacent the cylindrical wall by centrifugal force and upon continued injection of the air, it flows downstream in the furnace following a helical path. This flowing gas forms substantially a revolving hollow cylinder flowing from the inlet toward the outlet end of the furnace. The thus added air contacts the axially added hydrocarbons and burning occurs at the interface or contact surface.

In the combustion chamber 10 of Figure 1 it is intended that the reactant hydrocarbon be heated from its inlet temperature to a temperature at which reaction of hydrocarbon to carbon starts. However, only a little carbon should be permitted to form in the chamber. The heated hydrocarbon from the combustion section enters the smaller diameter reaction section in which combustion continues and the major part of the reaction to carbon black occurs. Upon passage from the reaction section to the outlet section additional mixing of the helical gas with the central contents occurs. In this final section, reaction may go to completion and certain desirable properties are imparted to the carbon black therein which it would not have if this section were omitted.

According to the second modification of the invention, shown in Figures 4 and 5, carbon black is produced by a second improved process using a reactor system of two cylindrical sections, one short section and a relatively long section of smaller diameter than that of the short section. The operation of this second furnace, broadly, consists in passing a vaporous hydrocarbon into the inlet end of said furnace, previously heated to reaction temperature. This hydrocarbon material passes through the short section and into and through the small diameter long section and finally leaves the furnace and passes through a cooler and to a carbon black separator in which the carbon black is separated from the furnace gases.

Into the short section 10 of Figure 4 is injected a quantity of air under high velocity through one or more tangentially disposed ports. Air so entering the furnace is intended to adhere to the circular walls of the furnace by centrifugal force and accordingly form a hollow cylindrical envelope surrounding the axially injected hydrocarbons. Upon continued injection of this air, it travels toward the outlet end of the furnace following a helical path along the furnace walls. At the surface of contact between the tangentially added air and the axially added central core of hydrocarbons is combustion and flame. Considerable mixing at this contact surface occurs since the hydrocarbons and the air are traveling substantially at right angles to each other. Sufficient mixing is intended to promote and continue combustion until the air has been consumed prior to exit of effluent from the reactor. All the tangential ports for the addition of air need not be in the enlarged section since some may be used in the small diameter section of said furnace.

In the operation of the second process in the second furnace of Figure 4 as herein disclosed it is intended that, in the large diameter section of the furnace, combustion of the axially added hydrocarbon is started and is supported by the tangentially added air without the production of carbon. In the elongated small diameter section, combustion is intended to continue until the free oxygen is consumed. By this time temperature is sufficiently high that the reaction of hydrocarbon to carbon has taken place and is completed before discharge from the outlet end of the furnace. The furnace effluent is, of course, cooled and the carbon black separated therefrom by any separation means desired.

Referring to Figure 1 which illustrates the preferred form of apparatus in which the first and preferred process of my invention may be practiced, a combustion chamber 10 communicates with a reaction chamber 11 which in turn communicates with an outlet chamber 12. These three chambers or sections are bounded with a refractory liner 13. Between this refractory liner 13 and a cylindrical steel shell 14 is a layer of insulating material 15.

In one furnace of the type shown in Figure 1 which I have used, the combustion section 10 was 15 inches in diameter and 1½ feet long, the reaction section was 9½ inches in diameter and 5 feet long measuring from the upstream end of the taper 16 and the outlet section was 15 inches in diameter by 5½ feet long. These dimensions are given merely as an example, and any or all dimensions may be varied as desired. Likewise the position of the small diameter or reactor section of the furnace may be moved longitudinally within limits. In modifying the furnace design, it must be borne in mind that combustion must be well started in the combustion section, continued in the reaction zone and completed in the outlet section while reaction to carbon may begin in the combustion section and continue in the reaction zone and be completed in the outlet zone. However, it is intended that only little combustion and little reaction to carbon take place in the outlet zone.

In the upstream or inlet end wall of the furnace of Figure 1 is a feed pipe assembly 17 which is shown in enlarged detail in Figure 3. This feed assembly is positioned in the wall axially or in such a manner that the reactant hydrocarbon will be injected axially or substantially axially into the furnace. The hydrocarbon feed pipe 18 is surrounded by a pipe 19 in such manner as to define an annular space 21 through which it is intended to pass air into the furnace. This air termed "annulus air" or "jacket air" originates at a source not shown, and is conducted through a pipe 20 into the annulus 21 from which it passes into the combustion chamber. This annulus air is intended to keep the feed pipe 18 cool to prevent deposition of carbon thereon, and to assist in burning off carbon which inadvertently might at times be formed on the combustion chamber end of this inlet pipe.

In the side wall of the combustion chamber 10 of Figure 1 are one or more tangentially disposed air inlets 22. The particular positioning of these tangential inlets is better illustrated in Figure 2. From this figure it is seen that a gas entering the furnace through one or more of these inlets does so in a direction tangent to the circular side wall. If the air or other gas enters the furnace at a high velocity it will flow around the cylindrical side wall and will adhere to the wall as a result of its centrifugal force. The actual number of these tangential inlets and their size may not be critical even for a given furnace. They may well be selected from an operational point of view, that is, their size and diameter should be such that when they are passing the required volume of air, its velocity will be sufficient to maintain a layer of air by centrifugal force on the combustion chamber side wall.

The outlet chamber 12 of the furnace of Figure 1 discharges effluent into a conduit 25 which may well be the same diameter as the chamber outlet. This conduit should preferably be rather short so that a water spray 26 may be used to cool the hot gases and black immediately after leaving the furnace. I have found that a water spray installed as shown to spray downward in the vertical leg 27 is a very efficient cooler and reaction arrestor.

If desired, a water jacket exchange cooler 40 may be installed around the outlet pipe of Figure 1 to assist the water spray 26 in cooling the furnace effluent. By use of such a jacket cooler the amount of spray water necessary to cool the furnace effluent to a predetermined temperature may be reduced in volume. It is desirable to use as little spray water as possible since the more spray water used produces a larger volume of gases or vapors from which the carbon black has ultimately to be separated. Moisture condensation in the carbon black collection equipment is of course to be avoided.

This jacket cooler of Figure 1 may be made in any form desired. For example, a tube jacket 35 may surround the outlet pipe 25 making a space 36 through which water or other cooling agent may be passed. The cooling agent may enter this space through an inlet pipe 37 and leave by way of an outlet pipe 38.

After being chill cooled by the water spray of Figure 1, the gases carrying the black may be further cooled by passing through a long section of pipe exposed merely to the atmosphere. Such a cooler I may term an "atmospheric cooler." From this atmospheric cooler the still warm gases and black pass into the carbon black separating means such as a bag filter house, or an electrostatic precipitator, etc. This carbon black separating means is identified in Figure 1 by reference numeral 29. From this separator the gases leave by way of an outlet 30 while the carbon black leaves through conduit 31 and may be transported to a pelleting apparatus, thence to storage, or other disposal as desired, and not shown.

I will hereinafter describe the operation of said furnace of Figure 1 for the manufacture of a hard carbon black using a charge oil having the following characteristics:

GAS, OIL, SAMPLE 1

A. S. T. M. distillation:

| | |
|---|---|
| First drop _____ temperature, °F__ | 420 |
| 5% _____ do____ | 449 |
| 10% _____ do____ | 457 |
| 20% _____ do____ | 466 |
| 30% _____ do____ | 474 |
| 40% _____ do____ | 484 |
| 50% _____ do____ | 490 |
| 60% _____ do____ | 506 |
| 70% _____ do____ | 524 |
| 80% _____ do____ | 560 |
| 90% _____ do____ | 630 |
| End point _____ do____ | 672 |
| Recovery _____ per cent__ | 96 |
| Pour point _____ °F__ | −40 |
| Carbon residue (Conradson) _____ per cent__ | 0.20 |
| Gravity, A. P. I. _____ degrees__ | 19.7 |
| Aniline No. (°F.) _____ | 31.8 |
| Flash point, °F. (P. M.) _____ | 200 |
| Refractive index _____ | 1.5342 |

While a gas oil having the exact properties of gas oil, Sample 1, may be used in the furnace of Figure 1 for the production of my carbon black, the properties of the oil may vary somewhat and yet produce carbon black such as herein disclosed. The approximate permissible specification limits are for the most part not especially critical save that the oil should be of such a type as to possess a low A. P. I. gravity, from approximately 16° to 25° A. P. I., and at the same time have a low boiling range and end point, the latter not substantially higher than about 700° F. While it is preferable that all the oil be in vapor form at the outlet of the preheater, I have found that when a minimum of about 90% of the oil is vapor at that point, operation of the furnace is satisfactory. Such a combination of properties (low boiling range and low A. P. I. gravity) indicates that the oil is high in aromatic and/or naphthenic hydrocarbon content and such an oil (poor for further gasoline production by cracking) is best adapted for making my carbon black.

While such an oil as that just described is a preferred feed stock of Figure 1, my invention is not intended to be limited thereby since other feed stocks such as hydrocarbon gases, light liquids such as pentane, hexane, or even gasoline or kerosene boiling range hydrocarbons may be used. Even oils heavier or higher boiling than the above described degraded gas oil may be used. Such oils may be vaporized prior to injection into my carbon black furnace, or partly vaporized, or even liquid feed may be atomized in a suitable atomizer apparatus and injected as such as the carbon containing feed stock. Hydrocarbons originating from distillation or oil shale may serve as feed stocks as well as petroleum hydrocarbons.

In the operation of my furnace of Figure 1 as herein disclosed for the manufacture of a highly reinforcing carbon black, or black capable of imparting extraordinary abrasion resistance to vulcanized rubber the furnace must first, of course, be heated to reaction temperature.

In heating the furnace of Figure 1, that is, beginning with a cold furnace, one may inject a mixture of a combustible gas and air into the furnace through one or more of the tangential inlets, or may inject the mixture through the reactant hydrocarbon inlet tube or annulus, or may inject gas alone axially and air tangentially. When the furnace has reached a sufficiently high temperature, preheated and vaporized oil may be added axially and air alone tangentially, with the resulting carbon black passed to waste or other disposal until the furnace is sufficiently hot and the quality of black satisfactory to segregate as product. In regular operation the oil charge may be vaporized and preheated in any manner desired to about 675° F. and introduced at this temperature through the inlet tube 18 into the furnace. In the tests reported herein, this tube 18 was a 1-inch inside diameter tube centered in a 1½ inch inside diameter tube 19 leaving the annulus 21 through which the annulus or jacket air was passed into the furnace. About 4,000 cubic feet of annulus air per hour was used in these tests. However, the exact volume of air so added is not critical and may be varied as desired, the important point being to maintain the discharge end of tube 18 sufficiently cool to prevent deposition of carbon thereon, or in case some carbon is formed, the air is intended to remove the carbon by combustion.

The main amount or volume of air is added through the tangential inlets 22 of Figure 1 at a sufficiently high velocity that the air spreads over the combustion chamber surface and follows in general a helical path on its way to the furnace outlet. Upon reaching the downstream end of the combustion chamber 10, the tangentially moving air, and gases formed by combustion, move on into the small diameter reaction zone 11. These gases still adhere to the reaction zone surface by centrifugal force from their helical movement. These gases apparently rotate at a greater R. P. M. in the reaction zone 11 than in the combustion zone on account of the smaller diameter of the former. The taper section 16 of the refractory may be made at a 30° angle with respect to the furnace axis to obtain at least some streamlining effect as the gaseous materials enter the reaction zone. In other words, it is not intended that the helically moving air and the axially moving reactant hydrocarbon materials mix completely at this point, but it is intended that some mixing occur. With some mixing resulting in further combustion, the reactant hydrocarbons are further heated and it is intended that at this point the reactant hydrocarbon has been heated to reaction temperature and that reaction has been started and will continue in the reaction zone 11 so that as the furnace contents leave the reaction zone 11 and enter the outlet zone 12 reaction will be nearly complete.

Since reaction is complete or substantially complete I do not make provision to add air tangentially to the outlet zone 12 of Figure 1. The helically moving residual gases, as nitrogen, and gases of combustion and other materials as are rotated by contact with the helically moving layer, enter the outlet zone and these materials continue to rotate even after they have passed from the furnace and entered the pipe 25. However, the speed or rate of rotation is materially reduced on account of the increased diameter of this outlet section. I have operated my furnace as herein disclosed for long periods of time without deposition of carbon on the side walls.

The streamlining effect of member 16 of Figure 1, as mentioned hereinabove, is intended to give some mixing of the helically moving air with the axially moving reactant hydrocarbons. If the change of diameter at this point were abrupt, that is if the angle of member 16 approaches 90°, more mixing occurs at this point, while if the angle of taper is as small as 10°, apparently insufficient mixing ordinarily occurs, and under both these conditions I find a degradation in the hardness and reinforcing properties of carbon black so produced. This angle need not be exactly 30°, but may be varied somewhat and to such an extent only that sufficient mixing will occur so that the major portion of the reaction will be complete upon entrance of the furnace contents into the outlet section 12.

A taper section may also be used between the reaction section 11 and the outlet section 12 of Figure 1 if desired, but the carbon black so produced is softer and less reinforcing than when the change of diameter on passing from section 11 to section 12 is abrupt.

*Example A*

In the following runs the furnace used had a combustion section 15 inches in diameter by 1½ feet in length, a reaction zone 9½ inches in diameter by 5 feet in length, and an outlet section 15 inches in diameter and 5½ feet in length. The upstream edge of the reaction section liner was ground off to make approximately a 30° angle with the axis so as to prevent too much mixing of the helically moving blanket with the axially moving reactants at the point of change of diameter.

The operating conditions in this series of tests are given in Table I.

*Table I*

| Run No. | Oil Rate, G. P. H. | Tang. Air, C. F. H. | Jacket Air, C. F. H. | Yield, lbs. per gal. |
|---|---|---|---|---|
| F39L1 | 100 | 48,000 | 4,000 | 2.30 |
| F41 | 75 | 33,000 | 4,000 | 2.58 |
| F44 | 125 | 60,000 | 4,000 | 1.98 |

Samples of carbon black made in this furnace of Figure 1 under the above given operating conditions were tested for reinforcing value (abrasion resistance of vulcanized rubber containing this black) and other properties. The blacks were made up with GR-S rubber stock according to the following formula:

GR-S rubber stock
GR-S stock _____ 100.0
Carbon black _____ 50.0
Zinc oxide _____ 3.0
BRt No. 7 _____ 6.0
Sulphur _____ 1.75
Santocure _____ 0.8

These compounds were vulcanized at 280° F. for 75 minute periods as indicated and the resulting rubber samples tested with the following results:

Table II

| Run No. | 300% Modulus, p. s. i. | Tensile, p. s. i. | Elongation, percent | Heat Build-up, °F. | Resilience, percent | Abrasion Loss, gms. |
|---|---|---|---|---|---|---|
| FS39L1 | 2,370 | 3,270 | 400 | 91.7 | 59.8 | 1.82 |
| F41 | 2,200 | 3,030 | 405 | 90.7 | 60.7 | 1.88 |
| F44 | 2,325 | 3,230 | 400 | 89.3 | 60.1 | 1.61 |

In Table II above and Tables III and V below the term "300% modulus, p. s. i." refers to the pounds per square inch pull in a tension test when the test piece of vulcanized rubber has been stretched 300% of the length of the original test piece. The "Tensile p. s. i." column represents the pounds per square inch pull at the point of rupture or break of the test piece undergoing the above mentioned 300% modulus test. The "Elongation, per cent" column represents the stretch or elongation at the point of "break." The "Heat buildup, °F." as used herein may be defined as the temperature rise in degrees F. above 100° F. of a sample of rubber of standard size when exposed to rapid flexing under standardized conditions. "Resilience, per cent" may be defined as the complement of the hysteresis loss, or more simply expressed, is a measure of the potential energy of a piece of rubber that is present as a result of applied stress and which is recoverable when the stress is removed. "Abrasion loss, gms." may be defined as the loss of weight in grams of a test piece of rubber of standard size when exposed to standard abrasion conditions.

The positioning of the choke or reaction section 11 in my furnace of Figure 1 is more or less critical. The prior art teaches that it is advantageous to have, not a long choke, but a short choke or "mixing orifice" in the downstream section of a carbon black making furnace. I have found that my reaction section should be relatively long and the center of the reaction section or choke should be located in the upstream half of the furnace. To determine the criticality of the length and of the location of this small diameter section I have made a number of tests, which are reported as follows:

Basing the quality of the carbon black on the abrasion resistance, which property is one of the most important properties of vulcanized rubber when the rubber is to be used as tire tread stock, it is evident that the carbon black made in the furnace with a long choke or reaction section terminating at about the midpoint of the furnace of Figure 1 is the best black of those reported, i. e. F39.

In run No. F39, the reaction section 11 was 60 inches or 5 feet long in a 12 foot furnace of Figure 1. This 5 foot length includes the taper section 16 which is positioned just 18 inches from the inlet end of the furnace. The center of the choke is upstream of the midpoint of the furnace.

The carbon black samples made in the furnace described in Table III under the above given conditions were milled into rubber compound according to the compound formula:

| | Parts by weight |
|---|---|
| GR-S—rubber stock | 100 |
| ZnO | 3 |
| Carbon black | 50 |
| BRT No. 7 | 6 |
| Sulfur | 1.75 |
| Santocure | 0.8 |

The samples of compound were vulcanized at 307° F. for 30 minutes for all test data except for abrasion loss, which samples were vulcanized for 45 minutes and oven-aged at 212° F. for a 24 hour period.

In the run of F39, the carbon black made a finished rubber which lost only 1.48 grams in the standard abrasion test. This value, it will be observed, is the lowest of the several abrasion loss tests reported.

In test F160 the combustion section of the furnace was the same size as in test F39 but the choke was 30 inches long in place of 60 inches. This rubber sample was some inferior to that of the F39 run, that is, it lost 1.74 grams. Thus a shortened choke or reaction zone is apparently undesirable.

In the remaining tests reported in this table, the choke was 60 inches long, but its position changed. In test F250 the choke was 30 inches

Table III

[15-inch by 12-foot reactor, 9½-inch diameter reaction section 11 (inlet end streamlined) as shown in Figure 1 with a 15-inch diameter outlet section 12.]

REACTION SECTION 30 INCHES LONG, 18 INCHES FROM INLET END OF REACTOR

| Run No. | Oil Rate, G. P. H. | Tangential Air, C. F. H. | Jacket Air, C. F. H. | Yield, lbs. per gal. | 300% Modulus, p. s. i. | Tensile, p. s. i. | Elongation, percent | Heat Buildup, °F. | Resilience, percent | Abrasion Loss, gms. |
|---|---|---|---|---|---|---|---|---|---|---|
| F160 | 100 | 48,000 | 4,000 | 2.3 | 1,800 | 3,210 | 483 | 90.1 | 58.3 | 1.74 |

REACTION SECTION 60 INCHES LONG, 18 INCHES FROM INLET

| F39 | 100 | 48,000 | 4,000 | 2.2 | 2,060 | 3,360 | 448 | 90.5 | 57.6 | 1.48 |

REACTION SECTION 60 INCHES LONG, 30 INCHES FROM INLET

| F250 | 100 | 48,000 | 4,000 | 2.8 | 1,810 | 2,725 | 445 | 89.9 | 59.4 | 2.04 |

REACTION SECTION 60 INCHES LONG, 72 INCHES FROM INLET

| F258 | 75 | 36,000 | 4,000 | 3.0 | 1,575 | 2,570 | 498 | 83.2 | 62.0 | 2.78 |
| F259 | 100 | 44,000 | 4,000 | 3.3 | 1,720 | 2,800 | 503 | 83.2 | 61.9 | 3.12 |
| F256 | 100 | 48,000 | 4,000 | 3.1 | 1,850 | 2,720 | 453 | 85.9 | 61.0 | 2.63 |
| F257 | 125 | 60,000 | 4,000 | 3.1 | 1,790 | 2,730 | 463 | 85.0 | 61.2 | 2.59 |
| F260 | 150 | 78,000 | 4,000 | 3.0 | 1,960 | 2,835 | 440 | 85.2 | 61.1 | 2.04 |

Note.—All rubber test data in this table were obtained from samples vulcanized at 307° F. for 30 minutes excepting the abrasion loss data which were obtained from rubber vulcanized for 45 minutes and oven-aged for 24 hours at 212° F.

Carbon black made under generally similar conditions in a straight 15-inch diameter by 12-foot long furnace without a constricted reaction section, as herein disclosed, are less reinforcing. The abrasion losses on two such carbon blacks are 3.00 and 2.30 grams in contrast to 1.48 grams from test F39.

from the inlet, which positioning made the combustion zone longer. In tests F256 to F260, inclusive, the upstream end of the choke was positioned 72 inches from the furnace inlet. In this latter case, and with a 60 inch long choke the outlet section 12 was only 1 foot in length.

From the abrasion loss values listed in Table III, it is obvious that the length of the choke and its position in the furnace are critical. The positioning of the choke appears to have more effect on the abrasion resistance property than does the length of the choke. However, a 30 inch long choke is less desirable than a 60 inch long choke, and it is obvious that the choke should not be shorter than 30 inches.

Referring now to Figures 4 and 5 of the drawings, which illustrate a second modified form of the apparatus in which the process of my invention may be practiced, a combustion chamber 10 communicates with a reaction chamber 11A, which differs from corresponding part 11 of Figure 1 in that 11A extends the entire length of the furnace at the same diameter without enlarging as at 12 of Figure 1. Both chambers are surrounded by a refractory material or liner 13 which in fact defines the walls of the two chambers. This liner 13 is surrounded by an insulation material 15 which in turn is held by a steel shell 14. In one particular furnace which I have used the combustion chamber 10 was about 15 inches in diameter and 18 inches long measured to the point of the beginning of the tapered section. The reaction chamber 11A was 9½ inches in diameter and 10½ feet long, which length included the taper section 16. These dimensions are given merely as an example and any or all dimensions may be varied as desired. In modifying the dimensions of the furnace, however, it must be borne in mind that the combustion section must be sufficiently large so that combustion may be initiated and yet not so large that combustion will be completed therein, and the smaller diameter section must be of sufficient size that combustion can be finished and reaction of hydrocarbon to carbon started and completed in this section.

In the upstream or inlet end wall of the furnace of Figure 4 is a feed pipe assembly 17, which is shown in detail in Figure 3. This feed assembly is positioned in the wall axially with respect to the chambers 10 and 11A so that hydrocarbon feed will enter the furnace and can flow downstream in such a manner as not to impinge against the sidewalls at any point. The feed stock enters the furnace through a feed pipe 18 of the feed assembly as hereinbefore stated. Surrounding this feed pipe 18 is a pipe 19 positioned in such a manner as to form an annular space 21 between them. In operation, air herein termed annulus air or jacket air from a source, not shown, flows from a pipe 20 into the annulus or space 21 and thence into the furnace. It is intended that this jacket air assist in keeping the hydrocarbon feed pipe 18 cool and prevent carbon deposition thereon and ultimate plugging with carbon. And further, in case operation should vary from desired conditions and some carbon should deposit on the outlet end of the feed pipe 18, this jacket air is intended to support combustion of this carbon for its removal. While preferred this jacket air is often not essential.

In the sidewall of the furnace of Figure 4 are one or more openings or ports 22 arranged in such a manner that air or other gas entering the furnace therethrough does so in a direction tangent to the cylindrical furnace walls. The particular embodiment illustrated in the drawing shows four such tangentially disposed ports, two in the section shown and two in the half cutaway of Figure 1. It is intended that the air for example, which is injected into the furnace through these tangential ports, enters the chamber at such a high velocity that it is held by centrifugal force adjacent to the cylindrical walls. Upon continued addition of air through these ports, the air flows following a helical path and in fact forms a revolving hollow cylinder of air, the revolving motion, however, being of a helical nature. Thus an envelope or hollow cylinder of rotating air is intended to surround the hydrocarbons added through the inlet tube 18 to form a gaseous partition so that the hydrocarbons do not contact the walls in such a manner as to form deposits of carbon thereon. In this manner I am able to operate my carbon black furnace for long periods of time, that is, continuously, with substantially no deposition of carbon on the furnace walls.

If so desired, it is intended to be within the scope of this invention to have positioned in the sidewall of the reaction zone or small diameter section 11A of Figure 4 one or more tangential ports, as ports 22. Further, if desired, one or more of the ports 22 from the combustion section 10 may be located in the reaction section 11, or they may be additional ones.

The tangential ports 22 of Figure 4 may or may not be of the same diameter. Those illustrated in Figure 4 are of different size, the larger ones being positioned nearer the point of junction of the two furnace sections.

The diameter of these ports 22 of Figure 4 should be large enough to accommodate the volume of air necessary for a given operation and yet small enough that the injected air has sufficient velocity to maintain the helically moving layer of air adjacent the cylindrical walls of the furnace.

The tapered section 16 of Figure 4 may be just a few inches in length, the exact length being more or less immaterial. The angle which the conical surface of this section makes with the axis of the furnace will determine the length of this section and this may be determined specifically for each installation, if desired. The tapered section 16 assists in maintaining improved blanketing of the walls of the reactor and assists in prevention of carbon deposition on these reactor walls. It is preferred that such tapered section be included in the reactor. Carbon black can be made without the tapered section, that is, with a square shoulder at the point at which the diameter of the furnace changes, but the quality of the black so made is inferior in rubber reinforcing value to that made in a furnace having such a tapered section.

The furnace of Figure 4 discharges its helically moving effluent gas and suspended carbon black into a conduit 25 of about the same diameter as that of the reaction zone 11A. This conduit 25 discharges into a further conduit 27 in which is a water spray 26. This conduit 27 is surrounded by a jacket 35 at a spaced distance therefrom forming, in fact, a jacketed heat exchanger or cooler assembly 40. Water from a source, not shown, may enter the jacket space 36 by way of a pipe 37 and discharge through pipe 38 to any desired disposal. This cooling jacket assembly in combination with the water spray 26, I have found, cools the furnace products sufficiently to arrest reaction and to prevent deterioration of carbon black product due to possible continued reaction.

The conduit 25 of Figure 4 may be of such length as desired to conduct furnace products from the furnace to the cooler or quench system 40. If desired the conduit 25 may be dispensed with entirely and the quench system set adjacent the furnace so that conduit 27 receives the furnace product directly.

The quench system 40 of Figure 4 discharges its quenched or chilled effluent into a conduit 28, which may if desired be a long pipe of suitable construction and installation as to serve as a further cooler for the furnace products. This cooler may be termed an "atmospheric" cooler and merely serve as an indirect heat exchanger between the contents of the pipe 28 and the atmosphere. This cooler pipe 28 discharges the furnace product into a separating means 29 which is adapted to separate the carbon black from the furnace gases and the spray water vapors or steam. Broadly, this separating means may be a bag filter assembly, or an electrical precipitator assembly, or other standard means for separating finely divided solids from gases. From this separating means, off gases may pass to waste or to other disposal as desired through pipe 30 while the carbon black may be passed through conduit 31 to a pelleting mill, storage or other processing or disposal as desired.

In the operation of my furnace of Figure 4 as herein described, the furnace is, of course, heated to reaction temperature by extraneous means before the air is injected through the tangential ports 22 and before the hydrocarbon feed is added axially through the injector tube 18. This heating up operation may be performed by injecting an air-gas mixture through the tangential ports and burning the gas in the furnace. As an alternative, gas may be added through the hydrocarbon inlet tube 18 and air for supporting combustion may be added through the annulus 21 or may be added through the tangential ports 22.

When the furnace of Figure 4 has been heated to a satisfactory temperature, the preheating gases may be closed off. Air may then be turned through the tangential ports 22 and the annulus air turned on, and finally the hydrocarbon vapors from which carbon black is to be made are turned on through the inlet tube 18. These vapors immediately ignite in the hot furnace, and the carbon black making operation is under way.

As the hydrocarbons from which carbon black of good quality can be made according to the process and apparatus of Figure 4 of my invention, either normally gaseous or liquid hydrocarbon feeds can be used, although I prefer to use a low-gravity degraded oil having the following characteristics:

GAS OIL, SAMPLE 2

ASTM distillation:
```
    First drop_____Temperature, °F__   425
       5% _____do____   456
      10% _____do____   462
      20% _____do____   468
      30% _____do____   476
      40% _____do____   484
      50% _____do____   494
      60% _____do____   506
```

ASTM distillation:—Continued
```
      70% _____do____   520
      80% _____do____   548
      90% _____do____   611
    End point _____do____   670
    Recovery _____percent__   97
    API gravity _____degree__   19.5
    Carbon residue, Conradson
                            weight percent__   0.14
    Flash, Penske-Martens_____°F__   174
    SU viscosity at 100° F_____sec__   39
    Aniline No _____°F__   29.2
    Refractive index _____   1.5362
    Pour point _____°F__   −40
```

While a gas oil having the exact properties of gas oil, Sample 2, may be used in the furnace of Figure 4 for the prodution of my carbon black, the properties of the oil may vary somewhat and yet produce carbon black such as herein disclosed. The approximate permissible specification limits are for the most part not especially critical save that the oil should be of such a type as to possess a low A. P. I. gravity, from approximately 16° to 25° A. P. I., and at the same time have a low boiling range and end point. While it is preferable that all or nearly all the oil be in vapor form at the outlet of the preheater, I have found that operation is satisfactory when liquid or partly vaporized feed is used. Such a combination of properties (low boiling range and low A. P. I. gravity) indicates that the oil is high in aromatic and/or naphenic hydrocarbon content and such an oil (poor for further gasoline production by cracking) is best adapted for making my carbon black.

In the particular furnace of Figure 4 used in making the carbon black reported in the majority of the following tests, the combustion zone 10 was 15 inches in diameter by 18 inches long. The reaction zone 11A was 10½ feet long including the taper section 16, by 9½ inches in diameter. The taper section made a 30° angle with the axis of the furnace approximately. The two downstream tangential ports were of larger diameter than the two upstream ports.

For comparative purposes two runs (G3, G21) were made using the above described gas oil of gas oil, Sample 2, as charge stock and passing preheated vapor thereof at about 675° F. into a conventional purely cylindrical carbon black furnace of 9½ inches diameter by 12 feet in length. Air was added tangentially and the oil vapors added axially as hereinbefore described. The carbon black samples from this furnace were spray and jacket cooled, further cooled in an atmospheric cooler, then separated from the gases in a bag filter. These carbon blacks possessed the properties as given below in Table IV. In this same table are given results of two runs (F3, F224) using the above-described oil, which was vaporized and superheated to about 675° F. and passed axially into a conventional purely cylindrical carbon black furnace of 15 inches in diameter and 12 feet in length through an inlet pipe similar to pipe 18 of Figure 1.

The two samples F51 and F55 were made in the furnace illustrated in the attached drawing and according to the process of this invention.

In these tests, about 50 cubic feet of free air was injected through the annulus 21 for each gallon of oil feed per hour.

Table IV

| Run No. | Oil Rate, Gal. per hr. | Preheat Temp., °F. | Tang. Air, Cu. ft. per hr. | Jacket Air, Cu. ft. per hr. | Yield, lbs. Per Gal. Oil | |
|---|---|---|---|---|---|---|
| G3 | 50 | 625 | 24,000 | 2,000 | 3.04 | 9½" x 12' reactor. |
| G21 | 75 | 675 | 39,000 | 4,000 | 2.6 | |
| F51 | 75 | 675 | 36,000 | 4,000 | 2.90 | 15" x 1½' section and 9½" x 10½' section. |
| F55 | 100 | 675 | 56,000 | 4,000 | 2.88 | |
| F3 | 100 | 625 | 44,000 | 3,000 | 3.64 | 15" x 12' reactor. |
| F224 | 220 | 675 | 115,000 | 8,000 | | |

The above carbon black samples were made up into rubber compound and vulcanized and the finished rubber tested for quality. A GR–S rubber stock was used in this compounding, according to the following formula:

| | Parts |
|---|---|
| GR–S | 100 |
| Zinc oxide | 3 |
| BRT No. 7 | 6 |
| Carbon black | 50 |
| Sulfur | 1.75 |
| Santocure | 0.8 |

These compounds were vulcanized and tested, giving the following results:

Table V

| Run No. | 300% Modulus, p. s. i. | Tensile, p. s. i. | Elongation, Percent | Oven aged 24 hrs. @ 100° C. | | |
|---|---|---|---|---|---|---|
| | | | | Heat Build-up | Resilience, Percent | Abrasion Loss, gms. |
| G3 | 2,190 | 2,820 | 400 | 76.0 | 63.2 | 2.59 |
| G21 | 2,150 | 2,860 | 415 | 79.3 | 63.0 | 2.25 |
| F51 | 2,220 | 2,920 | 395 | 83.7 | 60.3 | 1.91 |
| F55 | 2,430 | 3,015 | 370 | 86.5 | 59.6 | 1.75 |
| F3 | 2,060 | 2,530 | 390 | 77.7 | 69.3 | 3.00 |
| F224 [1] | 1,800 | 2,950 | 445 | 88.0 | 58.5 | 2.30 |

[1] Average of three samples.

In any of the above given tests of either the furnaces of Figures 1 or 4, no carbon or substantially no carbon deposits formed on the walls of the combustion or reaction chambers. The helically moving layer of air, air and combustion gases and finally combustion gases appeared to be an efficient means for separating the carbon producing zone and the walls of the furnace.

It may be noted from Table V that the furnace of Figure 4 as herein described produced carbon black which in turn favorably modified the abrasion properties of a GR–S rubber compounded with the black. In the G3 and G21 tests in which the small diameter conventional purely cylindrical furnace (9½ inches by 12 feet) was used to make the carbon black, the abrasion loss was 2.59 and 2.25 grams. In the larger (15 inch diameter by 12 feet) conventional purely cylindrical furnace, the carbon blacks prepared yielded rubbers having abrasion losses of 3.00 grams and 2.30 grams (F3 and F224 samples, resp.). In the tests using the furnace of Figure 4 of this invention the blacks made therein yielded rubbers having abrasion losses of only 1.91 and 1.75 grams (F51 and F55 samples). Thus the design of a furnace as well as its operation is pertinent to the preparation of a carbon black possessing commercially desirable properties. The oil rates in runs G21, F55, and F224 were high for each furnace and the blacks produced were of high reinforcing value.

The size or the volume of the combustion section of my furnaces of both Figures 1 and 4 should be as small as possible but yet sufficiently large as to promote a smooth combustion.

The exact size or dimensions of the furnaces which I have used are merely exemplary. Since these dimensions are not critical, they may be varied somewhat and yet obtain a highly rubber reinforcing carbon black.

Materials of construction, as for example, preheater furnace tubes, furnace insulation and lining, etc., may be selected from among those items commercially available and best suited to the operating conditions as herein disclosed without departing from the scope of my invention.

While I have shown certain specific apparatus in the drawings and have described certain specific process steps in the examples in the specifications, this has been done in order to fully disclose the invention, the scope of which is defined by the following claims.

Having described my invention, I claim:

1. The method of producing a carbon black, which carbon black is highly reinforcing when compounded with a GR–S type synthetic rubber stock and the compound vulcanized, comprising introducing gas oil vapors free of normally gaseous hydrocarbons axially into the inlet end of an insulated cylindrical and short combustion zone having an inlet end wall and an open outlet end and forming therein a central axial stream of gas, introducing air into said combustion zone in a direction tangent to the inner wall of said combustion zone and forming thereby a helically moving layer of gas adjacent said inner wall, burning a portion of said gas oil vapors with the tangentially added air to heat the remaining gas oil vapors to a carbon black forming temperature, passing said helically moving layer of gas and central axial stream of gas containing the combustion products and the remaining air and heated gas oil vapors, with a partial amount of mixing, into an elongated, insulated and cylindrical reaction zone of smaller diameter and greater length than the combustion zone, therein continuing the combustion of the gas oil vapors with the remainder of the air previously added and converting the major portion of said remaining gas oil vapors to carbon black, passing said helically moving layer of gas containing hot combustion products from said reaction zone into a third cylindrical zone of the same diameter as said combustion zone as a helically moving layer of combustion products adjacent the cylindrical wall of said third zone, passing said central axial stream of gas containing the decomposition products and suspended carbon black from said reaction zone axially into the third zone as a core within said helically moving layer of combustion products, maintaining in said third zone said core of decomposition products and carbon black substantially at the carbon black forming temperature by radiant heat from the cylindrical sidewall and by direct heat exchange from said helically moving layer of combustion products, said three zones being disposed along a common axis and successively adjacent each other, removing the resulting gaseous material containing carbon black in suspension as an effluent from said third zone, cooling said effluent, and separating the carbon black from the gases.

2. The method of claim 1 wherein the air is introduced into the combustion zone through a plurality of inlet ports each arranged to introduce said air in a direction tangent to the inner wall of said combustion chamber.

3. A method of producing a carbon black, which carbon black is highly reinforcing when compounded with a GR-S type synthetic rubber stock in a standard compounding formula and the compound vulcanized, comprising introducing gas oil vapors free of normally gaseous hydrocarbons axially into the inlet end of an insulated, cylindrical and short combustion zone having an inlet end wall and an open outlet end and forming therein a central axial stream of gas, injecting air into said combustion zone through a port so disposed as to maintain adjacent the cylindrical wall of said zone and enclosing said axially added gas oil vapors a helically moving cylindrical layer of gas composed in said combustion zone of air and combustion products subsequently produced, burning a portion of said gas oil vapors in said combustion zone with said helically moving air to produce heat for reaction of gas oil vapors to carbon in a subsequent step and resulting in the formation of said combustion gases, passing said helically moving layer of gas and said central axial stream of gas with a partial amount of mixing into an elongated and insulated cylindrical reaction zone of smaller diameter than that of the combustion zone and of greater length, therein continuing the combustion of the gas oil vapors with the remainder of the air previously added converting the gas oil vapors to carbon black, said helically moving layer of gas rotating at a greater rate in said reaction zone than in the combustion zone, passing said helically moving layer of gas containing hot combustion products from said reaction zone into a third cylindrical zone of the same diameter as said combustion zone as a helically moving layer of combustion products adjacent the cylindrical wall of said third zone, passing the decomposition products and suspended carbon black from said reaction zone axially into the third zone as a core within said helically moving layer of combustion products and maintaining therein said core of decomposition products and carbon black substantially at the carbon black forming temperature by radiant heat from the cylindrical wall and by direct heat exchange from said helically moving layer of combustion products, said three zones being disposed along a common axis and adjacent one another so that effluent may pass successively through the three individual zones, cooling the effluent from said third zone and recovering the carbon black.

4. The method of claim 3 wherein the flow of effluent from the combustion chamber is streamlined in passage into the reaction chamber so as to produce only a partial amount of mixing of said helically moving layer of gas and said central axial stream of gas.

5. The method of claim 3 wherein the air is injected into the combustion chamber through a plurality of ports.

6. The method of producing a carbon black, which carbon black is reinforcing when compounded with a GR-S type synthetic rubber stock and the compound vulcanized, comprising introducing hydrocarbon vapors axially into the inlet end of an insulated cylindrical and short combustion zone having an inlet end wall and an open outlet end and forming therein a central axial stream of gas, introducing air into said combustion zone in a direction tangent to the inner wall of said combustion zone and forming thereby a helically moving layer of gas adjacent said inner wall, burning a portion of said hydrocarbon vapors with the tangentially added air to heat the remaining hydrocarbon vapors to a carbon black forming temperature, passing said helically moving layer of gas and central axial stream of gas containing the combustion products and the remaining air and heated hydrocarbon vapors, with a partial amount of mixing, into an elongated, insulated and cylindrical reaction zone of smaller diameter and greater length than the combustion zone, therein continuing the combustion of the hydrocarbon vapors with the remainder of the air previously added and converting the major portion of said remaining hydrocarbon vapors to carbon black, passing said helically moving layer of gas containing hot combustion products from said reaction zone into a third cylindrical zone of a greater diameter than said reaction zone as a helically moving layer of combustion products adjacent the cylindrical wall of said third zone, passing said central axial stream of gas containing the decomposition products and suspended carbon black from said reaction zone axially into the third zone as a core within said helically moving layer of combustion products, maintaining in said third zone said core of decomposition products and carbon black substantially at the carbon black forming temperature by radiant heat from the cylindrical sidewall and by direct heat exchange from said helically moving layer of combustion products, said three zones being disposed along a common axis and successively adjacent each other, removing the resulting gaseous material containing carbon black in suspension as an effluent from said third zone, cooling said effluent, and separating the carbon black from the gases.

7. The method of claim 6 wherein the air is introduced into the combustion zone through a plurality of inlet ports each arranged to introduce said air in a direction tangent to the inner wall of said combustion chamber.

8. A method of producing a carbon black, which carbon black is reinforcing when compounded with a GR-S type synthetic rubber stock in a standard compounding formula and the compound vulcanized, comprising introducing hydrocarbon vapors axially into the inlet end of an insulated, cylindrical and short combustion zone having an inlet end wall and an open outlet end and forming therein a central axial stream of gas, injecting air into said combustion zone through a port so disposed as to maintain adjacent the cylindrical wall of said zone and enclosing said axially added hydrocarbon vapors a helically moving cylindrical layer of gas composed in said combustion zone of air and combustion products subsequently produced, burning a portion of said hydrocarbon vapors in said combustion zone with said helically moving air to produce heat for reaction of hydrocarbon vapors to carbon in a subsequent step and resulting in the formation of said combustion gases, passing said helically moving layer of gas and said central axial stream of gas with a partial amount of mixing into an elongated and insulated cylindrical reaction zone of smaller diameter than that of the combustion zone and of greater length, therein continuing the combustion of the hydrocarbon vapors with the remainder of the air previously added converting the hydrocarbon vapors to carbon black, said helically moving layer of gas rotating at a greater rate in said reaction zone than in the combustion zone, passing said helically moving layer of gas containing hot combustion products from said reaction zone into a third cylindrical zone of a greater diameter than said reaction zone as a helically moving layer of combustion products adjacent the cylindrical wall of said third zone, passing the decomposition products and suspended carbon black from said reaction zone axially into the third zone as a core within said helically moving layer of combustion products and maintaining therein said core of decomposition products and carbon black substantially at the carbon black forming temperature by radiant heat from the cylindrical wall and by direct heat exchange from said helically moving layer of combustion products, said three zones being disposed along a common axis and adjacent one another so that effluent may pass successively through the three individual zones, cooling the effluent from said third zone and recovering the carbon black.

9. The method of claim 8 wherein the flow of effluent from the combustion chamber is streamlined in passage into the reaction chamber so as to produce only a partial amount of mixing of said helically moving layer of gas and said central axial stream of gas.

10. The method of claim 8 wherein the air is injected into the combustion chamber through a plurality of ports.

11. The method of producing a carbon black, which carbon black is highly reinforcing when compounded with a GR-S type synthetic rubber stock and the compound vulcanized, comprising introducing gas oil vapors free of normally gaseous hydrocarbons axially into the inlet end of an insulated cylindrical and short combustion zone having an inlet end wall and an open outlet end and forming therein a central axial stream of gas, introducing air into said combustion zone in a direction tangent to the inner wall of said combustion zone and forming thereby a helically moving layer of gas adjacent said inner wall, burning a portion of said gas oil vapors with the tangentially added air to heat the remaining gas oil vapors to a carbon black forming temperature, passing said helically moving layer of gas and central axial stream of gas containing the combustion products and the remaining air and heated gas oil vapors, with a partial amount of mixing, into an elongated, insulated and cylindrical reaction zone of smaller diameter and greater length than the combustion zone, therein continuing the combustion of the gas oil vapors with the remainder of the air previously added and converting the remaining gas oil vapors to carbon black, said two zones being disposed along a common axis adjacent each other, removing the resulting gaseous material containing carbon black in suspension as an effluent from said second zone, cooling said effluent, and separating the carbon black from the gases.

12. The method of claim 11 wherein the air is introduced into the combustion zone through a plurality of inlet ports each arranged to introduce said air in a direction tangent to the inner wall of said combustion chamber.

13. A method of producing a carbon black, which carbon black is highly reinforcing when compounded with a GR-S type synthetic rubber stock in a standard compounding formula and the compound vulcanized, comprising introducing gas oil vapors free of normally gaseous hydrocarbons axially into the inlet end of an insulated, cylindrical and short combustion zone having an inlet end wall and an open outlet end and forming therein a central axial stream of gas, injecting air into said combustion zone through a port so disposed as to maintain adjacent the cylindrical wall of said zone and enclosing said axially added gas oil vapors a helically moving cylindrical layer of gas composed in said combustion zone of air and combustion products subsequently produced, burning a portion of said gas oil vapors in said combustion zone with said helically moving air to produce heat for reaction of gas oil vapors to carbon in a subsequent step and resulting in the formation of said combustion gases, passing said helically moving layer of gas and said central axial stream of gas with a partial amount of mixing into an elongated and insulated cylindrical reaction zone of smaller diameter than that of the combustion zone and of greater length, therein continuing the combustion of the gas oil vapors with the remainder of the air previously added converting the gas oil vapors to carbon black, said helically moving layer of gas rotating at a greater rate in said reaction zone than in the combustion zone, said two zones being disposed along a common axis and adjacent one another so that effluent may pass successively through the two individual zones, cooling the effluent from said second zone and recovering the carbon black.

14. The method of claim 13 wherein the flow of effluent from the combustion chamber is streamlined in passage into the reaction chamber so as to produce only a partial amount of mixing of said helically moving layer of gas and said central axial stream of gas.

15. The method of claim 13 wherein the air is injected into the combustion chamber through a plurality of ports.

16. The method of producing a carbon black, which carbon black is reinforcing when compounded with a GR-S type synthetic rubber stock and the compound vulcanized, comprising introducing hydrocarbon vapors axially into the inlet end of an insulated cylindrical and short combustion zone having an inlet end wall and an open outlet end and forming therein a central axial stream of gas, introducing air into said combustion zone in a direction tangent to the inner wall of said combustion zone and forming thereby a helically moving layer of gas adjacent said inner wall, burning a portion of said hydrocarbon vapors with the tangentially added air to heat the remaining hydrocarbon vapors to a carbon black forming temperature, passing said helically moving layer of gas and central axial stream of gas containing the combustion products and the remaining air and heated hydrocarbon vapors, with a partial amount of mixing, into an elongated, insulated and cylindrical reaction zone of smaller diameter and greater length than the combustion zone, therein continuing the combustion of the hydrocarbon vapors with the remainder of the air previously added and converting the remaining hydrocarbon vapors to carbon black, said two zones being disposed along a common axis adjacent each other, removing the resulting gaseous material containing carbon black in suspension as an effluent from said second zone, cooling said effluent, and separating the carbon black from the gases.

17. The method of claim 16 wherein the air is introduced into the combustion zone through a plurality of inlet ports each arranged to introduce said air in a direction tangent to the inner wall of said combustion chamber.

18. A method of producing a carbon black, which carbon black is reinforcing when compounded with a GR-S type synthetic rubber stock in a standard compounding formula and the compound vulcanized, comprising introducing hydrocarbon vapors axially into the inlet end of an insulated, cylindrical and short combustion zone having an inlet end wall and an open outlet end and forming therein a central axial stream of gas, injecting air into said combustion zone through a port so disposed as to maintain adjacent the cylindrical wall of said zone and enclosing said axially added hydrocarbon vapors a helically moving cylindrical layer of gas composed in said combustion zone of air and combustion products subsequently produced, burning a portion of said hydrocarbon vapors in said combustion zone with said helically moving air to produce heat for reaction of hydrocarbon vapors to carbon in a subsequent step and resulting in the formation of said combustion gases, passing said helically moving layer of gas and said central axial stream of gas with a partial amount of mixing into an elongated and insulated cylindrical reaction zone of smaller diameter than that of the combustion zone and of greater length, therein continuing the combustion of the hydrocarbon vapors with the remainder of the air previously added converting the hydrocarbon vapors to carbon black, said helically moving layer of gas rotating at a greater rate in said reaction zone than in the combustion zone, said two zones being disposed along a common axis and adjacent one another so that effluent may pass successively through the two individual zones, cooling the effluent from said second zone and recovering the carbon black.

19. The method of claim 18 wherein the flow of effluent from the combustion chamber is streamlined in passage into the reaction chamber so as to produce only a partial amount of mixing of said helically moving layer of gas and said central axial stream of gas.

20. The method of claim 18 wherein the air is injected into the combustion chamber through a plurality of ports.

JOSEPH C. KREJCI.

REFERENCES CITED

The following references are of record in the file of this patent:

UNITED STATES PATENTS

| Number | Name | Date |
| --- | --- | --- |
| 2,039,981 | Rembert | May 5, 1936 |
| 2,368,827 | Hanson et al. | Feb. 6, 1945 |
| 2,375,795 | Krejci | May 15, 1945 |
| 2,419,565 | Krejci | Apr. 29, 1947 |
| 2,499,438 | Weigand et al. | Mar. 7, 1950 |